US008696259B2

(12) United States Patent
Hecht

(10) Patent No.: US 8,696,259 B2
(45) Date of Patent: Apr. 15, 2014

(54) TOOL HOLDER HAVING SET SCREW FOR CLAMPING A CUTTING INSERT THEREIN

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 80 days.

(21) Appl. No.: 13/420,243

(22) Filed: Mar. 14, 2012

(65) Prior Publication Data

US 2013/0202372 A1  Aug. 8, 2013

Related U.S. Application Data

(60) Provisional application No. 61/594,038, filed on Feb. 2, 2012.

(51) Int. Cl.
  *B23B 27/00*  (2006.01)
  *B23B 29/00*  (2006.01)
(52) U.S. Cl.
  USPC .......................................... 407/101; 407/109
(58) Field of Classification Search
  USPC ..................... 407/91, 101, 109, 105
  See application file for complete search history.

(56) References Cited

U.S. PATENT DOCUMENTS

| | | | | |
|---|---|---|---|---|
| 3,523,349 A | * | 8/1970 | Pollington et al. | 407/68 |
| 3,894,322 A | * | 7/1975 | Pano | 407/110 |
| 5,207,537 A | * | 5/1993 | Englund | 407/110 |
| 5,267,817 A | * | 12/1993 | Englund | 407/110 |
| 5,360,298 A | * | 11/1994 | Hedlund | 407/110 |
| 5,743,680 A | | 4/1998 | Von Haas et al. | |
| 5,829,923 A | * | 11/1998 | Nowicki | 407/91 |
| 6,270,294 B1 | | 8/2001 | Sjöö et al. | |
| 2008/0131215 A1 | | 6/2008 | Sjoo | |

FOREIGN PATENT DOCUMENTS

JP  H03 15001 U  2/1991

OTHER PUBLICATIONS

International Search Report dated Apr. 18, 2013 issued in PCT counterpart application (No. PCT/IL2013/050020).

* cited by examiner

*Primary Examiner* — Will Fridie, Jr.
(74) *Attorney, Agent, or Firm* — Womble Carlyle

(57) ABSTRACT

A tool holder has a body portion and a holding portion, the holding portion having a base jaw and a clamping jaw, with an insert receiving pocket therebetween extending in a forward to rearward direction, and a first slot extending generally rearwardly from the insert receiving pocket. The base jaw has a support surface, and the clamping jaw has upper and lower arms separated by a second slot and extending in the generally forward direction. The lower arm has a forward end and an under surface facing towards the support surface, the under surface having a clamping portion adjacent the forward end. The upper arm has a bore which opens out to the second slot at a location rearward of the clamping portion. The bore can accommodate a force application member which can contact and displace the lower arm towards the base jaw to clamp a cutting insert.

21 Claims, 4 Drawing Sheets

TOOL HOLDER HAVING SET SCREW FOR CLAMPING A CUTTING INSERT THEREIN

RELATED APPLICATIONS

This application claims priority to U.S. Provisional Patent Application No. 61/594,038, filed 2 Feb. 2012, whose contents are incorporated by reference in their entirety.

FIELD OF THE INVENTION

The present invention relates to a tool holder for use in metal cutting processes in general, and for grooving and parting operations in particular.

BACKGROUND OF THE INVENTION

Within the field of tool holders used in grooving and parting operations, there are many examples of cutting inserts being clamped in an insert receiving pocket of a narrow blade-shaped holding portion between a rigid base jaw and a flexible clamping jaw. Some of these tool holders are configured such that the cutting insert is actively clamped between the clamping jaw and the base jaw by means of a clamping member.

U.S. Pat. No. 3,894,322 discloses such a tool holder having a rectangular shank and a head at the forward end thereof. The front side of the head is in the form of a narrow vertical wall with a forwardly opening recess for receiving a cutting insert. The recess includes parallel upper and lower edges and an interconnecting semi-circular back edge. A horizontal slot extends rearwardly from the back edge to a circular slot end in the shank, thus dividing the head into upper and lower jaws. Rearward of the narrow vertical wall, a bolt passes through a clearance hole in the upper jaw and engages a tapped hole in the lower jaw. When tightened, the bolt draws the upper and lower jaws together and clamps the cutting insert within the recess. The depth of insertion of the tool holder is limited by the amount of force that can be efficiently transmitted from the tightening of the bolt to the clamping of the cutting insert.

U.S. Pat. No. 5,360,298 discloses a tool holder in the form of a thin plate or plate-like part, having a recess for receiving a cutting insert, the recess being defined by a bottom wall, a rear wall, and an upper wall which is part of an elastically movable clamping arm. From the rear wall extends a comparatively narrow slot, and a clamping screw passes through a substantially vertical hole in the clamping arm and engages a threaded hole in the plate under the slot. The clamping arm serves to clamp the cutting insert against the bottom wall by tightening the clamping screw. The threaded hole in the plate under the slot may inherently weaken the structure of tool holder and limit its operational range. Also, inclusion of a coolant duct extending along the length of the clamping arm may be restricted by the vertical hole.

It is an object of the present invention to provide an improved and more robust tool holder.

It is also an object of the present invention to provide a tool holder configured to provide efficient active clamping of a cutting insert in an insert receiving pocket. It is a further object of the present invention to provide a cutting tool configured to perform grooving and parting operations at a large depth of insertion relative to the holder width.

It is still a further object of the present invention to provide a cutting tool which can be configured to direct coolant from a coolant duct in close proximity to the operative cutting edge of a cutting insert assembled therein.

SUMMARY OF THE INVENTION

In accordance with the present invention, there is provided a tool holder comprising:

a body portion and a holding portion, the holding portion having a base jaw and a clamping jaw, with an insert receiving pocket therebetween extending in a forward to rearward direction, and a first slot extending generally rearwardly from the insert receiving pocket, the base jaw having a support surface facing in an upward direction in a side view of the tool holder, the clamping jaw having upper and lower arms separated by a second slot, and extending from upper and lower terminal ends, respectively, in the generally forward direction, the lower arm being elongated and having a lower resilience axis of rotation at its lower terminal end, the lower arm having a forward end distal from the lower terminal end, and an under surface facing towards the support surface, the under surface having a clamping portion adjacent the forward end, the upper arm provided with a bore having a bore axis, the bore extending in the direction of the lower arm and opening out to the second slot at a location rearward of the clamping portion, in a side view of the tool holder.

A force application member can be retained in the bore. The force application member may be in the form of a set screw having a screw axis, and the bore may be threaded. The set screw may be threadingly engaged in the threaded bore.

Also in accordance with the present invention, there is provided a method of clamping a cutting insert in a tool holder such as described above, the cutting insert having opposing first and second insert surfaces and an operative cutting edge associated with the first insert surface.

The method comprises the steps of:

positioning the cutting insert forward of the insert receiving pocket with a portion of the second insert surface in contact with the support surface, sliding the cutting insert rearwardly into the insert receiving pocket, and rotating the set screw in one direction about its screw axis until the lower arm is displaced towards the base jaw and a clamping force is applied between the clamping portion and the first insert surface.

Further in accordance with the present invention, there is provided a cutting tool comprising:

a tool holder as described above; and a cutting insert actively clamped in the insert receiving pocket between the under surface and the support surface.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
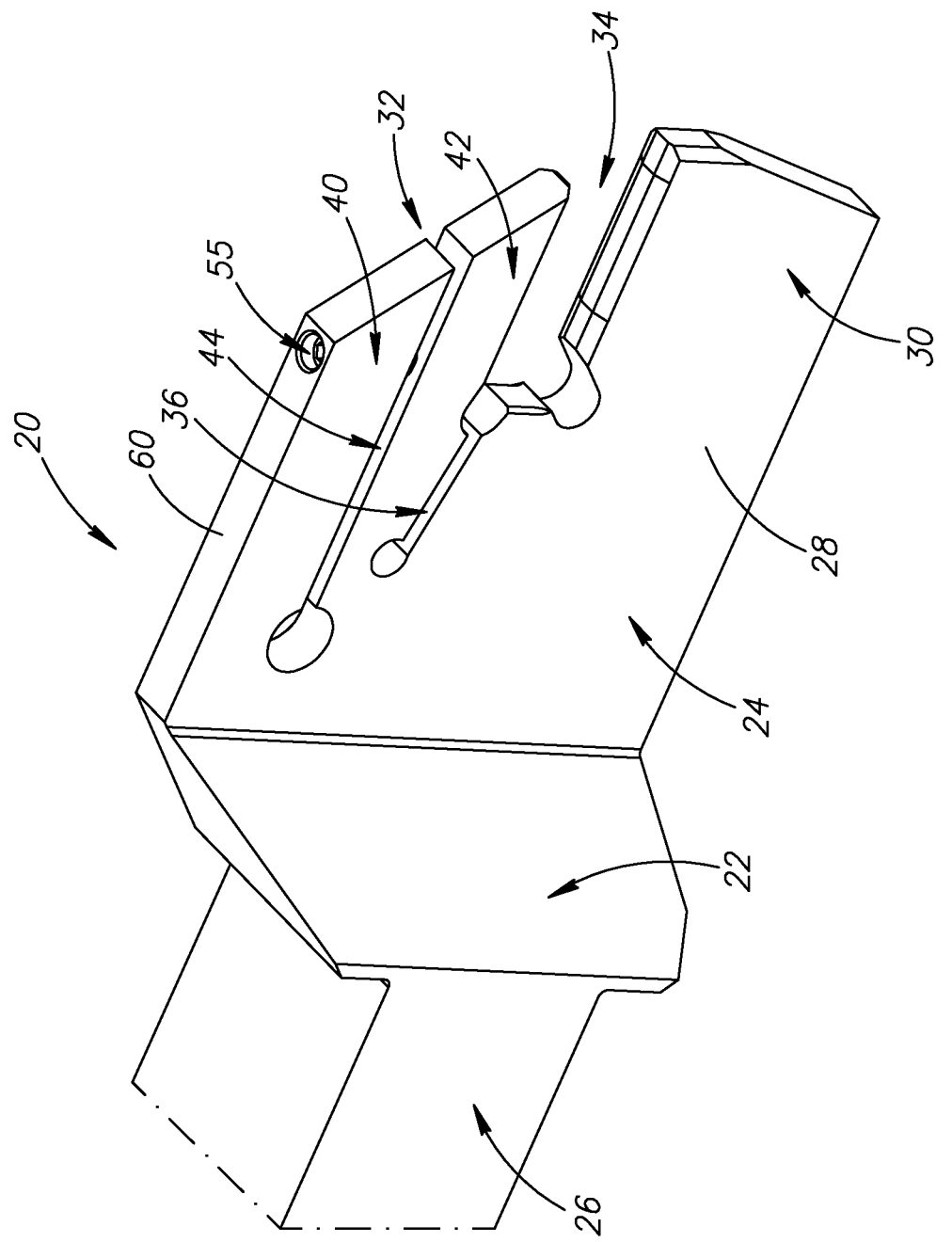
FIG. 1 is a perspective view of a tool holder in accordance with some embodiments of the present invention.
Figure 2:
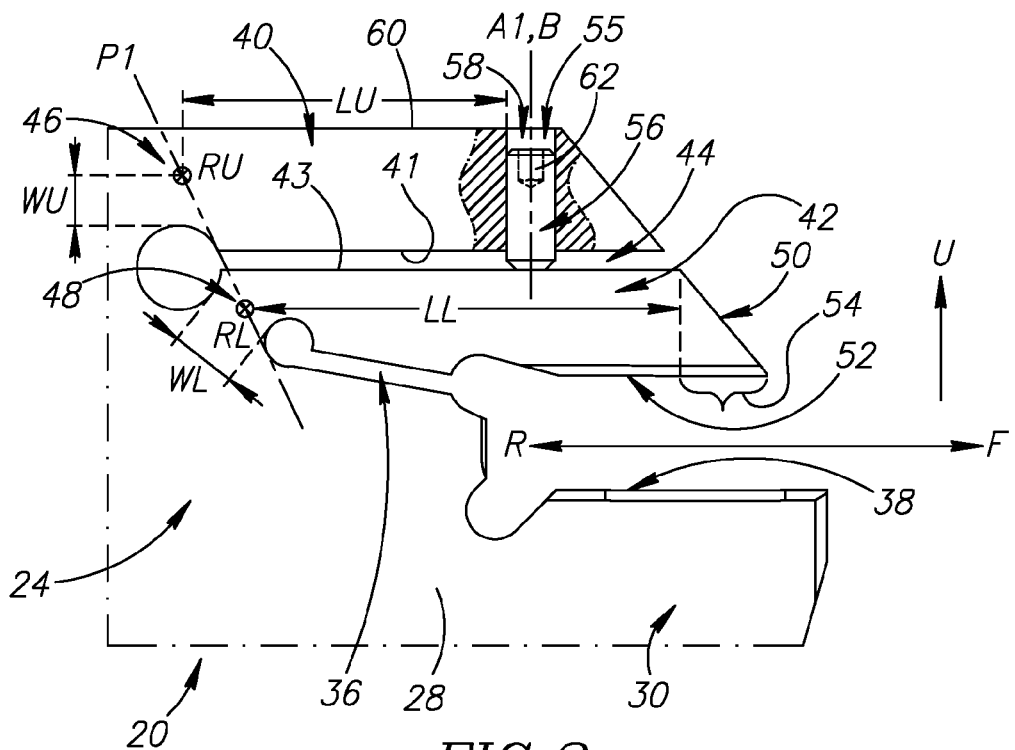
FIG. 2 is a side view of the tool holder shown in FIG. 1.
Figure 3:
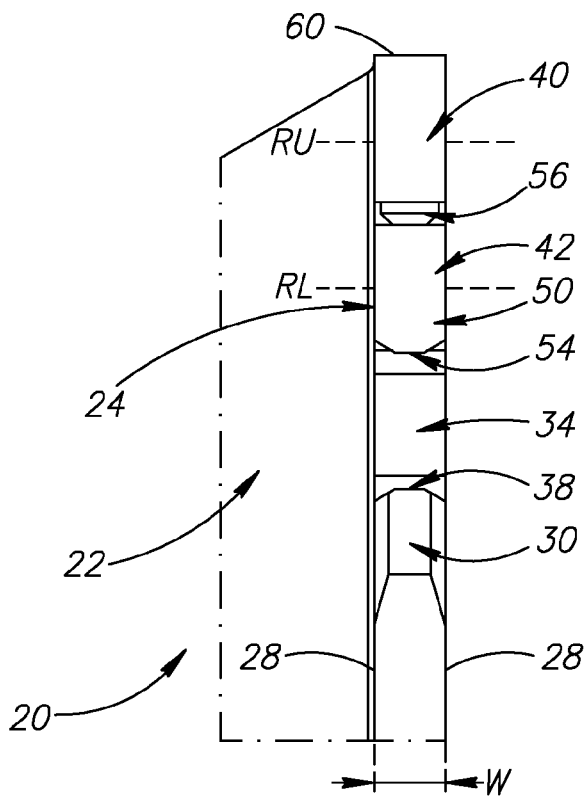
FIG. 3 is a front end view of the tool holder shown in FIG. 1.

Attention is first drawn to FIGS. 1, 2 and 3, showing a tool holder 20 in accordance with some embodiments of the present invention. The tool holder 20, which may be manufactured from hardened steel, comprises a body portion 22 and a holding portion 24.

In some embodiments of the present invention, as shown in FIG. 1, the body portion 22 may be rigidly fixed to the holding portion 24 and include a shank 26 extending away from the holding portion 24.

Also, in some embodiments of the present invention, as shown in FIG. 3, the holding portion 24 may be blade shaped having a generally constant holder width w between opposing side surfaces 28.

The holding portion 24 has a base jaw 30 and a clamping jaw 32, with an insert receiving pocket 34 therebetween extending in a forward to rearward direction F, R, and a first slot 36 extending generally rearwardly from the insert receiving pocket 34.

In some embodiments of the present invention, as shown in FIGS. 1 and 2, the first slot 36 may be elongated.

It should be understood that throughout the description and claims of the present invention, the term "elongated" denotes a member or slot having a general length greater than its respective terminal width.

The base jaw 30 has a support surface 38 facing in an upward direction U, in a side view of the tool holder 20.

It should be understood that throughout the description and claims of the present invention, the upward direction U is generally perpendicular to the forward to rearward direction F, R.

In some embodiments of the present invention, the support surface 38 may be V-shaped in a front end view of the tool holder 20, as shown in FIG. 3.

The clamping jaw 32 has upper and lower arms 40, 42 separated by a second slot 44. The upper arm 40 has an upper arm bottom surface 41 which faces the second slot 44, while the lower arm 42 has a lower arm top surface 43 which also faces the second slot 44. Thus, in the side view of the clamping jaw 32, the second slot 44 is at least partially defined between the upper arm bottom surface 41 and the lower arm top surface 43.

The upper and lower arms 40, 42 extend from upper and lower terminal ends 46, 48, respectively, in the generally forward direction F, the lower arm 42 being elongated and having a lower resilience axis of rotation RL at its lower terminal end 48.

In some embodiments of the present invention, as shown in FIG. 2, the upper arm 40 may be elongated and have an upper resilience axis of rotation RU at its upper terminal end 46, and the second slot 44 may be elongated.

Also, in some embodiments of the present invention, as shown in FIG. 3, the upper and lower resilience axes of rotation RU, RL may be generally parallel to the holder width w.

Further, in some embodiments of the present invention, as shown in FIG. 2, a first plane P1 containing the upper and lower resilience axes of rotation RU, RL may be transverse to the forward to rearward direction R, F.

The upper and lower arms 40, 42 also have upper and lower terminal widths WU, WL at their respective upper and lower terminal ends 46, 48, where in some embodiments of the present invention the upper terminal width WU may be greater than the lower terminal width WL, such that the upper arm 40 has greater rigidity than the lower arm 42.

The lower arm 42 has a forward end 50 distal from the lower terminal end 48 and an under surface 52 facing towards the support surface 38.

The under surface 52 includes a clamping portion 54 adjacent the forward end 50.

The lower arm 42 has a lower length LL measured between the lower resilience axis of rotation RL and the clamping portion 54.

In some embodiments of the present invention, the clamping portion 54 may be V-shaped in a front end view of the tool holder 20, as shown in FIG. 3.

The upper arm 40 has a bore 58 having a bore axis B which extends in the direction of the lower arm 40 and opens out to the second slot 44 at a location rearward of the clamping portion 54, in a side view of the tool holder 20. A force application member 55 can be retained in the bore 58. The bore 58 is preferably threaded so that the force application member 55, which may be in the form of a set screw 56 having a screw axis A1, can be threadingly engaged in the threaded bore 58. When the set screw 56 occupies the threaded bore 58, the screw axis A1 is coincident with the bore axis B. When threadingly engaged in the threaded bore 58, the set screw 56 is rotatable between a first position in which the set screw 56 does not contact the lower arm 42, and a second position in which the set screw 56 bridges the second slot 44 and contacts the lower arm 42. When the set screw 56 is in active contact with the lower arm 42, the set screw 56 displaces the lower arm 42 towards the base jaw 30, thereby actively clamping a cutting insert located in the insert receiving pocket 34. Thus, upon application of a displacement force Fd to the lower arm top surface 43 along the bore axis B, the lower arm 42 is resiliently displaceable towards the base jaw 30.

Configuration of the tool holder 20 having the set screw 56 located in the upper arm 40 negates the requirement for a threaded or through bore in the base jaw 30, and thus provides an inherently more robust tool holder 20 with a wider operational range. This advantage is especially apparent for smaller holder widths w.

Figure 6:
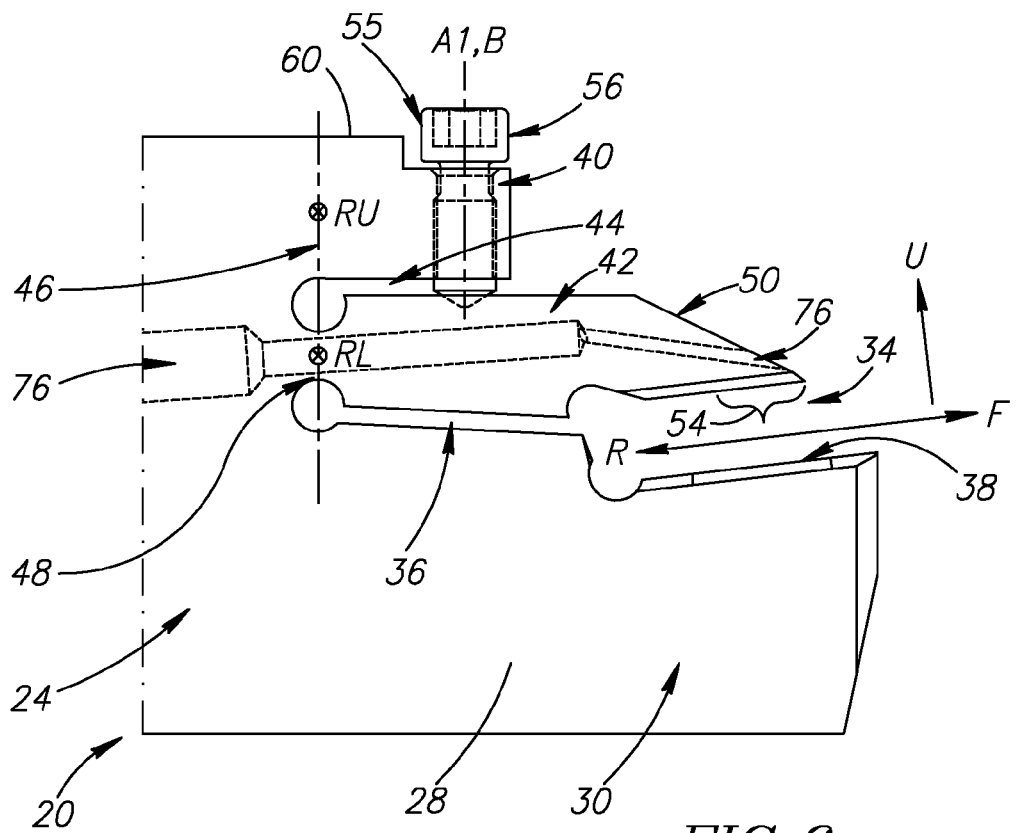
FIG. 6 is a side view of a tool holder in accordance with another embodiment of the present invention.

Configuration of the tool holder 20 having the set screw 56 located in the upper arm 40 also negates the requirement for a threaded or through bore in the lower arm 42, and in another embodiment of the present invention, as shown in FIG. 6, the lower arm 42 may include a cooling duct 76 extending from the lower terminal end 48 to the forward end 50, with the cooling duct 76 opening out at the forward end 50.

It should be understood that throughout the description and claims of the present invention, the term "active" or "actively" denotes the application of a force which overcomes the 'resilience' of an elongated member and displaces the said elongated member about its resilience axis of rotation.

In some embodiments of the present invention, as shown in FIG. 2, the bore axis B and screw axis A1 may be generally parallel to the upward direction U.

In other embodiments of the present invention (not shown) the set screw 56 may engage with a shallow recess in the lower arm 42 to limit lateral movement of the upper and lower arms 40, 42 with respect to each other.

The upper arm 40 has an upper length LU measured between the upper resilience axis of rotation RU and the threaded bore 58.

In some embodiments of the present invention, as shown in FIG. 2, the upper length LU may be less than the lower length LL.

Also, in some embodiments of the present invention, as shown in FIGS. 1 and 2, the threaded bore 58 may open out to a top surface 60 of the upper arm 40, where the top surface 60 faces generally upwardly.

Further, in some embodiments of the present invention, as shown in FIGS. 1 and 2, the set screw 56 may be headless, having a female type socket 62 for providing a means for engaging a socket wrench (not shown).

Employment of the headless set screw 56 can reduce the obstruction to chips flowing past the upper arm 40. This is especially the case when the set screw 56 is recessed into the threaded bore 58 and so does not project above the upper arm's top surface 60.

Alternatively, in another embodiment of the present invention, as shown in FIG. 6, the set screw 56 may include a head which acts as a stopper against the top surface 60 to prevent excessive rotation of the set screw 56.

The threaded bore 58 and the set screw 56 are located rearward of the clamping portion 54 and the lower arm 42 is capable of being displaced towards the base jaw 30 in response to rotation of the set screw 56 about its screw axis A1.

In some embodiments of the present invention, as shown in FIG. 2, the threaded bore 58 and the set screw 56, may be located forward of the lower resilience axis of rotation RL.

Also, in some embodiments of the present invention, as shown in FIG. 2, the bore axis B and the screw axis A1 extend in a direction which may intersect the under surface 52.

Further, in some embodiments of the present invention, as shown in FIG. 2, the threaded bore 58 and the set screw 56 may be located forward of the first slot 36.

Tool holders 20 configured with the set screw 56 forward of the first slot 36, and the screw axis A1 intersecting the under surface 52, provide efficient transmission of the displacement force Fd through the lower arm 42 and into a clamping force Fc applied to a cutting insert 64, located in the insert receiving pocket 34.

Figure 4:
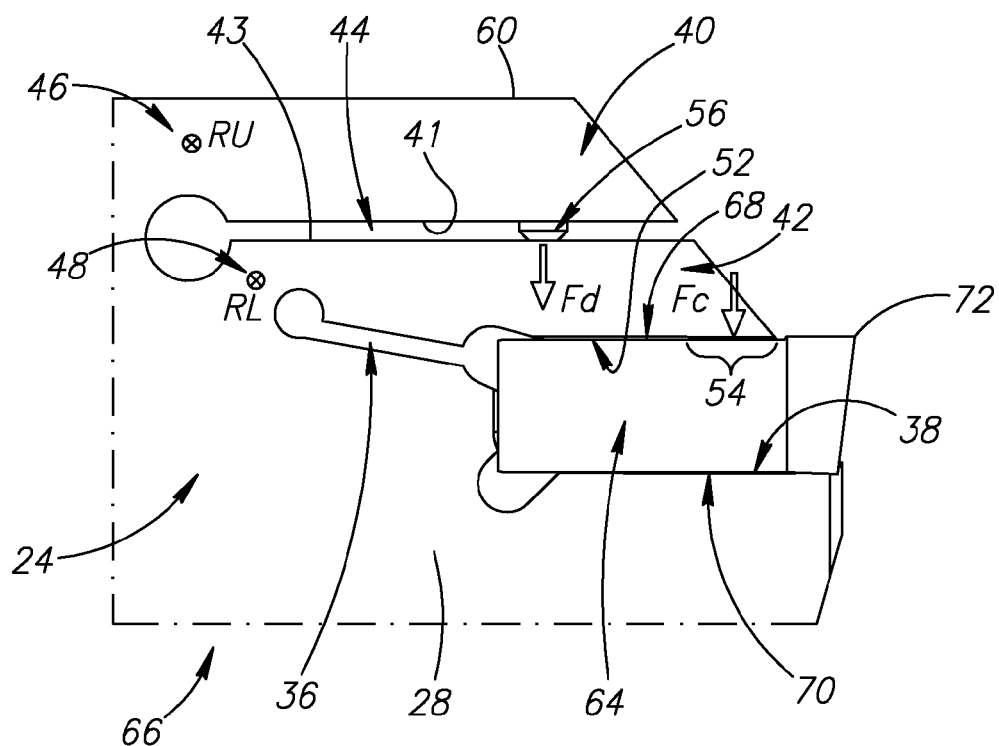
FIG. 4 is a side view of a cutting tool in accordance with some embodiments of the present invention.
Figure 5:
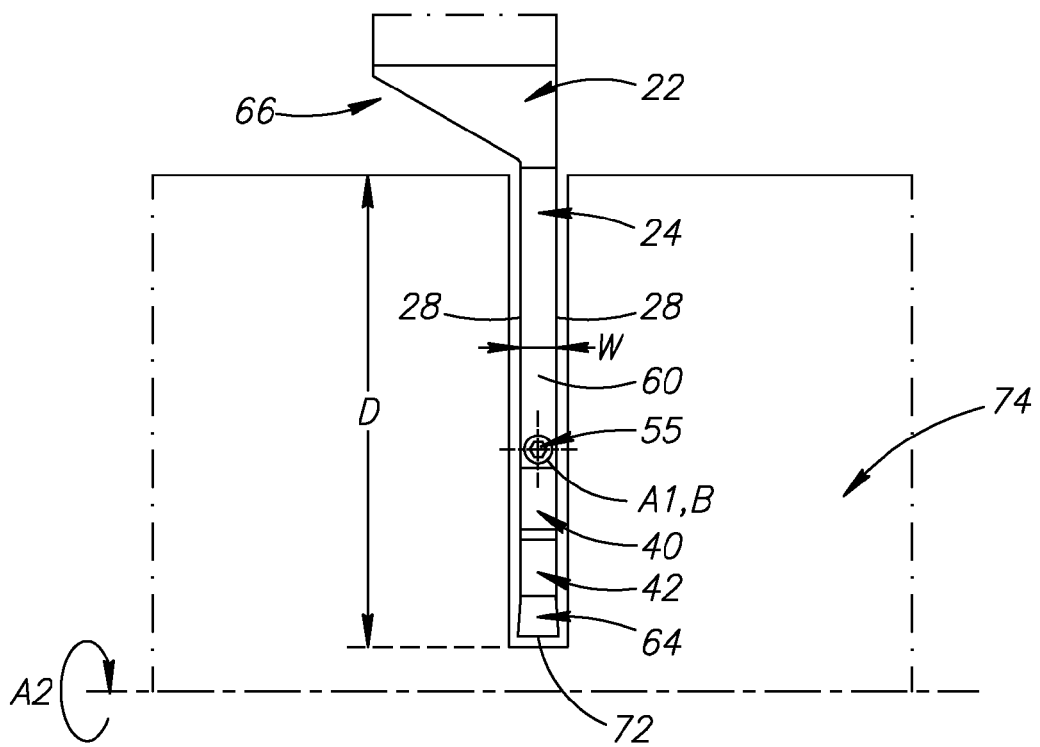
FIG. 5 is a top view of the cutting tool shown in FIG. 4 performing a cutting operation on a rotating workpiece.

Attention is now drawn to FIGS. 4 and 5, showing a cutting tool 66 in accordance with some embodiments of the present invention.

The cutting tool 66 comprises the previously described tool holder 20 with the cutting insert 64 actively clamped in the insert receiving pocket 34 between the under surface 52 and the support surface 38. The cutting insert 64 may be manufactured by form press and sintering a cemented carbide.

In some embodiments of the present invention, as shown in FIG. 4, the cutting insert 64 may have opposing first and second insert surfaces 68, 70 and an operative cutting edge 72 associated with the first insert surface 68, with the clamping portion 54 of the lower arm 42 making clamping contact with the first insert surface 68.

A gap is typically present between the under surface 52 of the lower arm 42 and the first insert surface 68 rearward of the clamping portion 54.

A method of clamping the cutting insert 64 in the cutting tool 66 comprises the steps of:

positioning the cutting insert 64 forward of the insert receiving pocket 34 with a portion of the second insert surface 70 in contact with the support surface 38, sliding the cutting insert 64 rearwardly into the insert receiving pocket 34, and rotating the set screw 56 in one direction about its screw axis A1 until the lower arm 42 is displaced towards the base jaw 30 and the clamping force Fc is applied between the clamping portion 54 and the first insert surface 68.

By virtue of the efficient transmission of the displacement force Fd through the lower arm 42, the cutting tool 66, as shown in FIG. 5, is advantageously configured to perform grooving and parting operations on a rotating workpiece 74 at a large depth of insertion D relative to the holder width w. The rotating workpiece 74 has a rotational axis A2 generally parallel to the holder width w.

Figure 7:
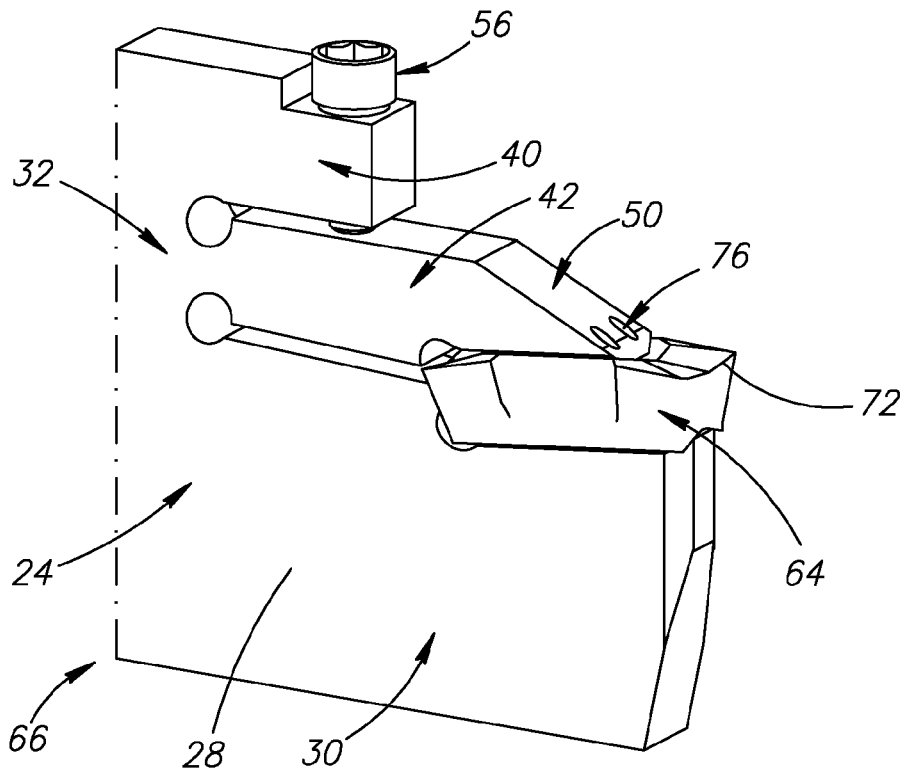
FIG. 7 is a perspective view of a cutting tool in accordance with another embodiment of the present invention.

By virtue of the lower arm 42 including a cooling duct 76 in another embodiment of the present invention, the cutting tool 66, as shown in FIG. 7, is advantageously configured to direct coolant from a point in close proximity to the operative cutting edge 72 of the cutting insert 64.

What is claimed is:

1. A tool holder (20) comprising:
a body portion (22) and a holding portion (24), the holding portion (24) having a base jaw (30) and a clamping jaw (32), with an insert receiving pocket (34) therebetween extending in a forward to rearward direction (F, R), and a first slot (36) extending generally rearwardly from the insert receiving pocket (34),
the base jaw (30) having a support surface (38) facing in an upward direction (U) in a side view of the tool holder (20),
the clamping jaw (32) having upper and lower arms (40, 42) separated by a second slot (44) and extending from upper and lower terminal ends (46, 48), respectively, in the generally forward direction (F),
the lower arm (42) being elongated and having a lower resilience axis of rotation (RL) at its lower terminal end (48), the lower arm (42) having a forward end (50) distal from the lower terminal end (48), and an under surface (52) facing towards the support surface (38), the under surface (52) having a clamping portion (54) adjacent the forward end (50), and
the upper arm (40) provided with a bore (58) having a bore axis (B), the bore (58) extending in the direction of the lower arm (42) and opening out to the second slot (44) at a location rearward of the clamping portion (54), in a side view of the tool holder;
wherein the bore (58) opens out to the second slot (44) at a location forward of the first slot (36).

2. The tool holder (20) according to claim 1, further comprising a force application member (55) retained in the bore (58).

3. The tool holder (20) according to claim 2, wherein the force application member (55) is in the form of a set screw (56) having a screw axis (A1), and the bore (58) is threaded, and
wherein the set screw (56) is threadingly engaged in the threaded bore (58).

4. The tool holder (20) according to claim 3, wherein
the set screw (56) is rotatable between a first position in which the set screw (56) does not contact the lower arm (42), and a second position in which the set screw (56) bridges the second slot (44) and contacts the lower arm (42).

5. The tool holder (20) according to claim 3, wherein the lower arm (42) is capable of being displaced towards the base jaw (30) in response to rotation of the set screw (56) about its screw axis (A1).

6. The tool holder (20) according to claim 1, wherein the bore (58) opens out to the second slot (44) at a location forward of the lower resilience axis of rotation (RL).

7. The tool holder (20) according to claim 1, wherein the bore axis (B) intersects the under surface (52).

8. The tool holder (20) according to claim 1, wherein the upper and lower arms (40, 42) have upper and lower terminal widths (WU, WL) at their respective upper and lower terminal ends (46, 48), and wherein the upper terminal width (WU) is greater than the lower terminal width (WL).

9. The tool holder (20) according to claim 1, wherein the upper arm (40) is elongated and has an upper resilience axis of rotation (RU) at its upper terminal end (46).

10. The tool holder (20) according to claim 9, wherein the upper arm (40) has an upper length (LU) measured between the upper resilience axis of rotation (RU) and the bore (58), and the lower arm (42) has a lower length (LL) measured between the lower resilience axis of rotation (RL) and the clamping portion (54), and
wherein the upper length (LU) is less than the lower length (LL).

11. The tool holder (20) according to claim 9, wherein a first plane (P1) containing the upper and lower resilience axes of rotation (RU, RL) is transverse to the forward to rearward direction (F, R).

12. The tool holder (20) according to claim 9, wherein the holding portion (24) is blade shaped having a generally constant holder width (w) between opposing side surfaces (28).

13. The tool holder (20) according to claim 12, wherein the upper and lower resilience axes of rotation (RU, RL) are generally parallel to the holder width (w).

14. A tool holder (20) comprising:
a body portion (22) and a holding portion (24), the holding portion (24) having a base jaw (30) and a clamping jaw (32), with an insert receiving pocket (34) therebetween extending in a forward to rearward direction (F, R), and a first slot (36) extending generally rearwardly from the insert receiving pocket (34),
the base jaw (30) having a support surface (38) facing in an upward direction (U) in a side view of the tool holder (20),
the clamping jaw (32) having upper and lower arms (40, 42) separated by a second slot (44) and extending from upper and lower terminal ends (46, 48), respectively, in the generally forward direction (F),
the lower arm (42) being elongated and having a lower resilience axis of rotation (RL) at its lower terminal end (48), the lower arm (42) having a forward end (50) distal from the lower terminal end (48), and an under surface (52) facing towards the support surface (38), the under surface (52) having a clamping portion (54) adjacent the forward end (50), and
the upper arm (40) provided with a bore (58) having a bore axis (B), the bore (58) extending in the direction of the lower arm (42) and opening out to the second slot (44) at a location rearward of the clamping portion (54), in a side view of the tool holder; wherein
the lower arm (42) includes at least one cooling duct (76) extending from the lower terminal end (48) to the forward end (50), and
wherein the at least one cooling duct (76) opens out at the forward end (50).

15. The tool holder (20) according to claim 1, wherein the first and second slots (36, 44) are elongated.

16. The tool holder (20) according to claim 1, wherein the bore (58) opens out to a top surface (60) of the upper arm (40), and
wherein the top surface (60) faces generally upwardly.

17. The tool holder (20) according to claim 1, wherein the bore axis (B) is generally parallel to the upward direction (U).

18. A method of clamping a cutting insert (64) in a tool holder (20), wherein:
the tool holder (20) is in accordance with claim 3; and the cutting insert (64) has opposing first and second insert surfaces (68, 70) and an operative cutting edge (72) associated with the first insert surface (68),
the method comprising the steps of:
positioning the cutting insert (64) forward of the insert receiving pocket (34) with a portion of the second insert surface (70) in contact with the support surface (38),
sliding the cutting insert (64) rearwardly into the insert receiving pocket (34), and
rotating the set screw (56) in one direction about its screw axis (A1) until the lower arm (42) is displaced towards the base jaw (30) and a clamping force (Fc) is applied between the clamping portion (54) and the first insert surface (68).

19. A cutting tool (66) comprising:
a tool holder (20) comprising:
a body portion (22) and a holding portion (24), the holding portion (24) having a base jaw (30) and a clamping jaw (32), with an insert receiving pocket (34) therebetween extending in a forward to rearward direction (F, R), and a first slot (36) extending generally rearwardly from the insert receiving pocket (34),
the base jaw (30) having a support surface (38) facing in an upward direction (U) in a side view of the tool holder (20),
the clamping jaw (32) having upper and lower arms (40, 42) separated by a second slot (44) and extending from upper and lower terminal ends (46, 48), respectively, in the generally forward direction (F),
the lower arm (42) being elongated and having a lower resilience axis of rotation (RL) at its lower terminal end (48), the lower arm (42) having a forward end (50) distal from the lower terminal end (48), and an under surface (52) facing towards the support surface (38), the under surface (52) having a clamping portion (54) adjacent the forward end (50), and
the upper arm (40) provided with a bore (58) having a bore axis (B), the bore (58) extending in the direction of the lower arm (42) and opening out to the second slot (44) at a location rearward of the clamping portion (54), in a side view of the tool holder; and
a cutting insert (64) clamped in the insert receiving pocket (34) between the under surface (52) and the support surface (38), wherein:
the bore (58) is occupied by a force application member (55) which bridges the second slot (44) and displaces the lower arm (42) towards the base jaw (30) to thereby clamp the cutting insert (64);
the cutting tool (66) has a depth of insertion (D); and
the entire bore (58) is located within the depth of insertion (D).

20. The cutting tool (66) according to claim 19, wherein the cutting insert (64) has opposing first and second insert surfaces (68, 70) and an operative cutting edge (72) associated with the first insert surface (68), and
wherein the clamping portion (54) of the lower arm (42) makes clamping contact with the first insert surface (68).

21. A tool holder (20) comprising:
a body portion (22) and a holding portion (24), the holding portion (24) having a base jaw (30) and a clamping jaw (32), with an insert receiving pocket (34) therebetween extending in a forward to rearward direction (F, R), and a first slot (36) extending generally rearwardly from the insert receiving pocket (34),
the base jaw (30) having a support surface (38), the clamping jaw (32) having upper and lower arms (40, 42) separated by a second slot (44) and extending in the generally forward direction (F), the lower arm (42) having a forward end (50), a lower arm top surface (43) facing the second slot (44) and an under surface (52) facing towards the support surface (38), the under surface (52) having a clamping portion (54) adjacent the forward end (50), and the upper arm (40) provided with a bore (58) having a bore axis (B), the bore (58) extending in the direction of the lower arm (42) and opening out to the second slot (44) at a location rearward of the clamping portion (54), in a side view of the tool holder; wherein:

the bore (58) opens out to the second slot (44) at a location forward of the first slot (36); and upon application of a displacement force (Fd) to the lower arm top surface (43) along the bore axis (B), the lower arm (42) is resiliently displaceable towards the base jaw (30).

\* \* \* \* \*